(12) United States Patent
Hussein et al.

(10) Patent No.: US 11,196,598 B1
(45) Date of Patent: Dec. 7, 2021

(54) MODULATION SCHEME FOR HIGH ORDER CONSTELLATION

(71) Applicants: Assem Shoukry Mohamed Hussein, Toronto (CA); Vincent Charles Gaudet, Ancaster (CA); Patrick Mitran, Waterloo (CA); Ming Jian, Kanata (CA)

(72) Inventors: Assem Shoukry Mohamed Hussein, Toronto (CA); Vincent Charles Gaudet, Ancaster (CA); Patrick Mitran, Waterloo (CA); Ming Jian, Kanata (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 16/890,482

(22) Filed: Jun. 2, 2020

(51) Int. Cl.
*H04L 27/20* (2006.01)
*H04L 27/34* (2006.01)
*H04L 27/26* (2006.01)
*H04L 27/38* (2006.01)

(52) U.S. Cl.
CPC ...... *H04L 27/2075* (2013.01); *H04L 27/2064* (2013.01); *H04L 27/2082* (2013.01); *H04L 27/2614* (2013.01); *H04L 27/3411* (2013.01); *H04L 27/38* (2013.01)

(58) Field of Classification Search
None
See application file for complete search history.

(56) References Cited

U.S. PATENT DOCUMENTS

| | | | | |
|---|---|---|---|---|
| 2004/0255221 A1* | 12/2004 | Shen | ............ | H04L 1/0058 714/752 |
| 2004/0261003 A1* | 12/2004 | Shen | ............ | H03M 13/258 714/792 |
| 2016/0006515 A1* | 1/2016 | Kojima | ............ | H04B 10/508 398/193 |
| 2016/0127166 A1* | 5/2016 | Zhang | ............ | H04B 10/5161 398/185 |
| 2019/0215223 A1* | 7/2019 | Chen | ............ | H04L 27/38 |
| 2020/0259607 A1* | 8/2020 | Xi | ............ | H04L 1/0005 |

OTHER PUBLICATIONS

H. Méric, "Approaching the Gaussian Channel Capacity With APSK Constellations", IEEE Communications Letters, (Jul. 2015), 4 pages.
Z. Liu et al., "APSK Constellation with Gray Mapping", IEEE Communications Letters, vol. 15, No. 12, Dec. 2011, pp. 1271-1273.

* cited by examiner

*Primary Examiner* — Diane L Lo

(57) ABSTRACT

Aspects of the present application provide methods and devices for using a combined QAM and APSK modulation scheme in a hybrid modulation form in order to benefit from advantages of each respective modulation scheme. The proposed hybrid modulation scheme is less sensitive to phase noise and has lower PAPR than QAM and has very similar performance as QAM with respect to AWGN.

20 Claims, 15 Drawing Sheets

4-QAM

1024-QAM

MODULATION SCHEME FOR HIGH ORDER CONSTELLATION

TECHNICAL FIELD

The present disclosure relates generally to wireless communications, and in particular embodiments, a new modulation scheme for a high order constellation for point to point microwave communication links.

BACKGROUND

In some networks, backhaul communications between transmit receive points (TRPs) may be connected to one another using a point-to-point (PTP) communication link. A particular example of such a PTP link may be a microwave range link. TRPs may use a microwave PTP link as a less expensive manner of communicating than a wired link. There is no need to run a physical link between the points. Two TRPs generally need a clear line of site and physical hardware at the two respective locations. Such a setup may be advantageous in a remote area where it would be difficult to access to lay a physical wired link or in a high traffic area, such a metropolitan area, to set up a new network where there is already physical structures, such as cell towers, to locate the TRPs on.

In a microwave PTP communication link, Quadrature Amplitude Modulation (QAM) is normally used as a modulation scheme due to its robust performance to additive white Gaussian noise (AWGN) and its ease of implementation.

Higher order modulation in PTP microwave links is often used to improve spectral efficiency. However, high order modulation is known to suffer from effects of AWGN, phase noise and peak-to-average power ratio (PAPR).

Therefore, alternative modulation schemes for higher order modulation that are less affected by AWGN, phase noise and PAPR would be beneficial for communication systems.

SUMMARY

Aspects of the present disclosure propose combining QAM and APSK modulation schemes in a hybrid modulation form in order to benefit from advantages of each respective modulation scheme. The proposed hybrid modulation scheme is less sensitive to phase noise and has lower PAPR than QAM and has very similar performance as QAM with respect to AWGN.

According to a first aspect of the disclosure there is provided a method involving modulating a set of bits by mapping the set of bits as a symbol to a point on a hybrid constellation that comprises a set of constellation points based on quadrature amplitude modulation (QAM) and a set of constellation points based on amplitude phase shift key (APSK) modulation and transmitting the modulated symbol.

In some embodiments, when the set of bits is $N_K$ bits, resulting in a symbol having one of $2^{N_K}$ possible values; the method further involves mapping bit values in the range of 0 to $2^{N_Q}-1$ to a constellation point on the hybrid constellation based on QAM modulation, where $N_Q<N_K$; and mapping bit values for a remainder of the $2^{N_K}$ bit values to a constellation point on the hybrid constellation based on APSK modulation.

In some embodiments, mapping bit values based on QAM modulation involves mapping to a constellation point located in the constellation based on a function $x=\sqrt{I_i^2+Q_i^2}$ exp(jθ) where I is an amplitude of an in-phase carrier and Q is an amplitude of a quadrature phase carrier, $i=0, 1, \ldots N_K-1$ and $$\theta = \tan^{-1}\frac{Q_i}{I_i}.$$

In some embodiments, mapping bit values based on APSK modulation comprises mapping to a constellation point located in the constellation based on a function $$\chi = \begin{cases} R_1\exp\left(j\left(\frac{2\pi}{M_1}i+\theta_1\right)\right), & i=0,\ldots,M_1-1, \\ R_2\exp\left(j\left(\frac{2\pi}{M_2}i+\theta_2\right)\right), & i=0,\ldots,M_2-1, \\ \vdots & \vdots \\ R_{N_C}\exp\left(j\left(\frac{2\pi}{M_{N_C}}i+\theta_{Nc}\right)\right), & i=0,\ldots,M_{N_C}-1, \end{cases}$$

where a modulation order of the APSK portion of the hybrid constellation is equal to the sum of all $M_L$ for $L=1, 2, \ldots, N_C$, wherein $N_C$ is a number of concentric rings, $N_C \geq 2$, $M_L$ is the number of constellation points in the Lth ring, $R_L$ is the radius of the Lth ring, $\theta_L$ is the phase offset of the Lth ring.

In some embodiments, changing the value $N_Q$ changes the number of constellation points that are mapped in the hybrid constellation based on QAM modulation.

In some embodiments, a distance D between a constellation point mapped based on QAM modulation and a closest constellation point mapped based on APSK modulation is equal to or greater than a distance d, which is a closest distance between adjacent constellation points mapped based on QAM modulation.

In some embodiments, the set of constellation points based on QAM in the hybrid constellation are arranged in a set of regular QAM constellation points or a set of irregular QAM constellation points.

According to a second aspect of the disclosure there is provided a method involving receiving a symbol that was modulated by mapping a set of bits as the symbol to a point on a hybrid constellation that comprises a set of constellation points based on quadrature amplitude modulation (QAM) and a set of constellation points based on amplitude phase shift key (APSK) modulation and demodulating the received symbol to recover the set of bits.

In some embodiments, when the set of bits is $N_K$ bits, resulting in a symbol having one of $2^{N_K}$ possible values; bit values in the range of 0 to $2^{N_Q}-1$, are mapped to a constellation point based on QAM modulation, where $N_Q<N_K$; and bit values for a remainder of the $2^{N_K}$ bit values are mapped based on APSK modulation.

According to a third aspect of the disclosure there is provided a device including a processor and a computer-readable medium having stored thereon. The computer executable instructions, when executed by the processor, cause the device to modulate a set of bits by mapping the set of bits as a symbol to a point on a hybrid constellation that comprises a set of constellation points based on quadrature amplitude modulation (QAM) and a set of constellation points based on amplitude phase shift key (APSK) modulation and transmit the modulated symbol.

In some embodiments, when the set of bits is $N_K$ bits, resulting in a symbol having one of $2^{N_K}$ possible values, map bit values in the range of 0 to $2^{N_Q}-1$, to a constellation point based on QAM modulation, where $N_Q<N_K$ and map bit values for a remainder of the $2^{N_K}$ bit values to a constellation point based on APSK modulation.

In some embodiments, bit values mapped based on QAM modulation to a constellation point located in the constellation based on a function $x=\sqrt{I_i^2+Q_i^2}\exp(j\theta)$ where I is an amplitude of an in-phase carrier and Q is an amplitude of a quadrature phase carrier, $i=0, 1, \ldots N_K-1$ and $$\theta = \tan^{-1}\frac{Q_i}{I_i}.$$

In some embodiments, bit values mapped based on APSK modulation to a constellation point located in the constellation based on use a function $$\chi = \begin{cases} R_1\exp\left(j\left(\frac{2\pi}{M_1}i+\theta_1\right)\right), & i=0,\ldots,M_1-1, \\ R_2\exp\left(j\left(\frac{2\pi}{M_2}i+\theta_2\right)\right), & i=0,\ldots,M_2-1, \\ \vdots & \vdots \\ R_{N_C}\exp\left(j\left(\frac{2\pi}{M_{N_C}}i+\theta_{N_c}\right)\right), & i=0,\ldots,M_{N_C}-1, \end{cases}$$

where a modulation order of the APSK portion of the hybrid constellation is equal to the sum of all $M_L$ for $L=1, 2, \ldots, N_C$, wherein $N_C$ is a number of concentric rings, $N_C \geq 2$, $M_L$ is the number of constellation points in the Lth ring, $R_L$ is the radius of the Lth ring, $\theta_L$ is the phase offset of the Lth ring.

In some embodiments, changing the value $N_Q$ changes the number of constellation points that are mapped to the hybrid constellation based on QAM modulation.

In some embodiments, a distance D between a constellation point mapped based on QAM modulation and a closest constellation point mapped based on APSK modulation is equal to or greater than a distance d, which is a closest distance between adjacent constellation points mapped based on QAM modulation.

In some embodiments, the set of constellation points based on QAM in the hybrid constellation are arranged in a set of regular QAM constellation points or a set of irregular QAM constellation points.

In some embodiments, the device is a network side device or a user equipment (UE).

According to a fourth aspect of the disclosure there is provided a device including a processor and a computer-readable medium having stored thereon. The computer executable instructions, when executed by the processor, cause the device to receive a symbol that was modulated by mapping a set of bits as the symbol to a point on a hybrid constellation that comprises a set of constellation points based on quadrature amplitude modulation (QAM) and a set of constellation points based on amplitude phase shift key (APSK) modulation; and demodulate the received symbol to recover the set of bits.

In some embodiments, when the set of bits is $N_K$ bits, resulting in a symbol having one of $2^{N_K}$ possible values, bit values in the range of 0 to $2^{N_Q}-1$, are mapped to a constellation point based on QAM modulation, where $N_Q<N_K$; and bit values for a remainder of the $2^{N_K}$ bit values are mapped based on APSK modulation.

In some embodiments, the device is a network side device or a user equipment (UE).

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of the present disclosure propose combining QAM and APSK modulation schemes in a hybrid modulation form in order to benefit from advantages of each respective modulation scheme. The proposed hybrid modulation scheme is less sensitive to phase noise and has lower PAPR than QAM and has very similar performance as QAM with respect to AWGN.

Figure 1:
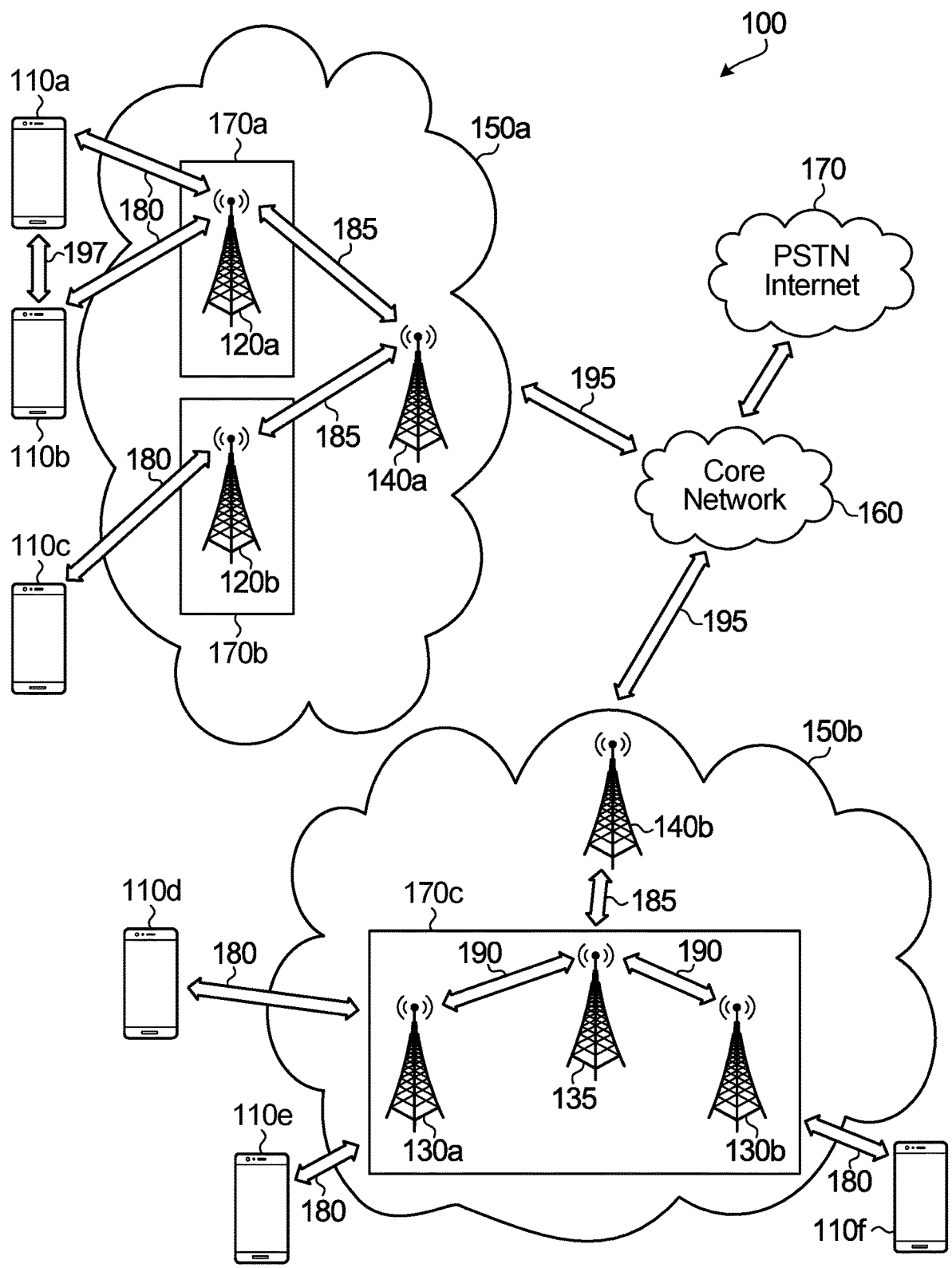
FIG. 1 is a schematic diagram of a communication system in which embodiments of the disclosure may occur.

FIGS. 1 and 2 following below provide context for the network and devices that may be in the network and that may implement aspects of the present disclosure.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110f, base stations (BS) 130a-130b, a base station controller (BSC) 135, collocated BS and BSC 120a-120b, mobile switching centers 140a-140b, a core network 160, and a data network 170 including a public switched telephone network (PSTN) and the Internet. A first backhaul portion 150a of the system 100 that enables communication between the EDs 110a-110c and the core network 160 includes the collocated BS and BSC 120a-120b and mobile switching center 140a. A second backhaul portion 150b of the system 100 that enables communication between the EDs 110d-110f and the core network 160 includes the BS 130a-130b, the BSC 135 and mobile switching center 140b. Collocated BSs and BSCs 120a-120b are illustrated in FIG. 1 as part of radio access networks (RANs) 170a-170b, respectively. BSs 130a-130b and BSC 135 are illustrated as part of RAN 170c. While certain numbers of these components or elements are shown in FIG. 1, any reasonable number of these components or elements may be included in the system 100.

The EDs 110a-110f are configured to operate, communicate, or both, in the communication system 100. For example, the EDs 110a-110f are configured to transmit, receive, or both via wireless or wired communication channels. Each ED 110a-110f represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device. In some embodiments, signalling occurring over the communication link 180 between the ED 110 and base station 120,130 may utilize a hybrid modulation scheme as described in the present disclosure.

In FIG. 1, the base stations, whether they are alone 130a-130b, or base stations collocated with the base station controllers 120a-120b, are configured to wirelessly interface with the EDs 110a-110f via communication link 180. The base stations 130a-130b are configured to wirelessly, or through a wired connection, interface with the base station controllers (for example base station controller 135) whether they are remote from one another and use communication link 190, or are collocated. The base station controllers 135 are configured to wirelessly, or through a wired connection, interface with a mobile switching controllers 140a, 140b through communication links 185. The mobile switching controllers 140a, 140b are configured to wirelessly, or through a wired connection, interface with the core network 160 through connections 195.

A communication link 190 between the base station 130a-130b and base station controller 135 may be a wired connection, a fiber optic connection or a microwave link connection. The communication link 185 between the base station controllers 120a-120b, 135 and mobile switching controllers 140a-140b. may be a wired connection, a fiber optic connection or a microwave link connection.

The base stations 120a-120b, 130a-130b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110f may be alternatively or additionally configured to interface, access, or communicate with any other base station 120a-120b, 130a-130b, the internet and the PSTN, or any combination of the preceding.

The interfaces between the base stations, base station controllers and mobile switching controllers collectively may be considered the backhaul that provides a connection between the EDs and the core network.

Base stations 120a-120b and 130a-130b are examples of communication equipment that can be configured to implement some or all of the functionality and/or embodiments described herein. In the embodiment shown in FIG. 1, the base stations 120a-120b and 130a-1300b form part of RANs 170a-170c, which may include other base stations, base station controller(s) (BSC), radio network controller(s) (RNC), relay nodes, elements, and/or devices. Any base station 120a-120b and 130a-130b may be a single element, as shown, or multiple elements, distributed in the corresponding RAN, or otherwise. Each base station 120a-120b and 130a-130b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 170a-170c shown is exemplary only. Any number of RAN may be contemplated when devising the communication system 100.

The base stations 120a-120b and 130a-130b communicate with one or more of the EDs 110a-110f over one or more air interfaces 180 using wireless communication links e.g. radio frequency (RF), microwave, infrared (IR), etc. The air interfaces 180 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 120a-120b and 130a-130b may implement Universal Mobile Telecommunication System (UMTS) Terrestrial Radio Access (UTRA) to establish an air interface 180 using wideband CDMA (WCDMA). In doing so, the base station 120a-120b and 130a-130b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

In the backhaul portion 150b, the base stations 130a-130b communicate with base station controller 135 over air interfaces 190 using wireless communication links e.g. radio frequency (RF), microwave, and infrared (IR). The base station controller 135 communicates with the mobile switching controller 140b over air interfaces 185 using wireless communication links. In the backhaul portion 150a, the combined base stations and base station controllers 120a-120b communicate with the MSC 140a over air interfaces 185 using wireless communication links. The air interfaces 185 and 190 may utilize any suitable radio access or backhaul technology. For example, the communication system 100 may implement one or more orthogonal or non-orthogonal channel access or backhaul methods, such as code division multiple access (CDMA), time division multiple access (TDMA), frequency division multiple access (FDMA), orthogonal FDMA (OFDMA), or single-carrier FDMA (SC-FDMA) in the air interfaces 190.

The RANs 170a-170c are in communication with the core network 160 via backhaul portions 150a-150b to provide the EDs 110a-110f with various services such as voice, data, and other services. The RAN s 170a-170c and/or the core network 160 may be in direct or indirect communication with one or more other RANs (not shown) via additional backhaul portions, which may or may not be directly served by core network 160, and may or may not employ the same radio access technology as RAN s 170a-170c. The core network 160 may also serve as a gateway access between (i) the RANs 170a-170c or EDs 110a-110f or both, and (ii) other networks (such as the PSTN and the internet 150).

Figure 2A:
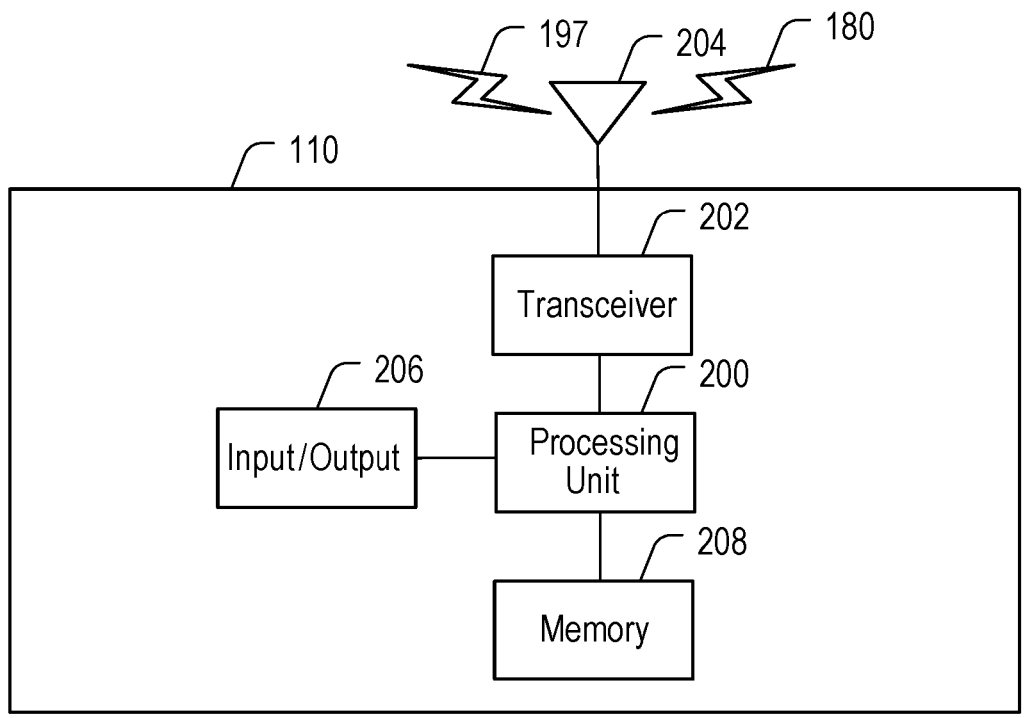
FIG. 2A is a block diagram of an example electronic device (ED) in which embodiments of the disclosure may occur.
Figure 2B:
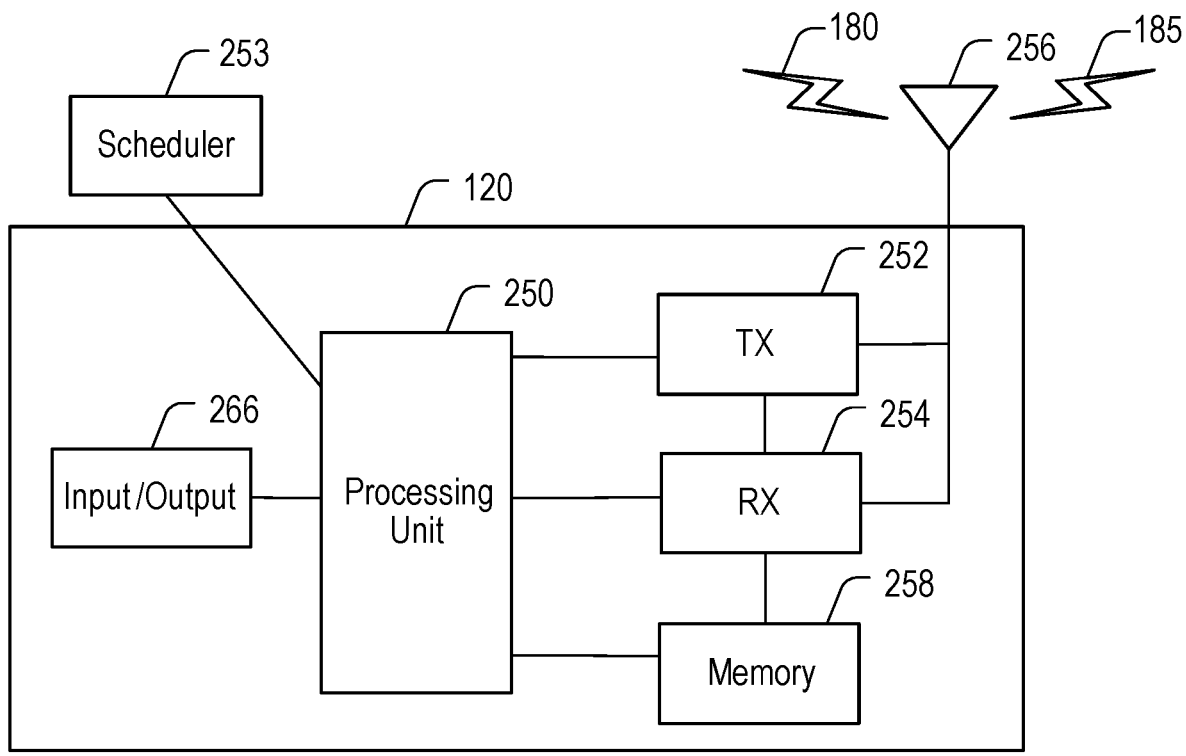
FIG. 2B is a block diagram of an example base station in which embodiments of the disclosure may occur.
Figure 2C:
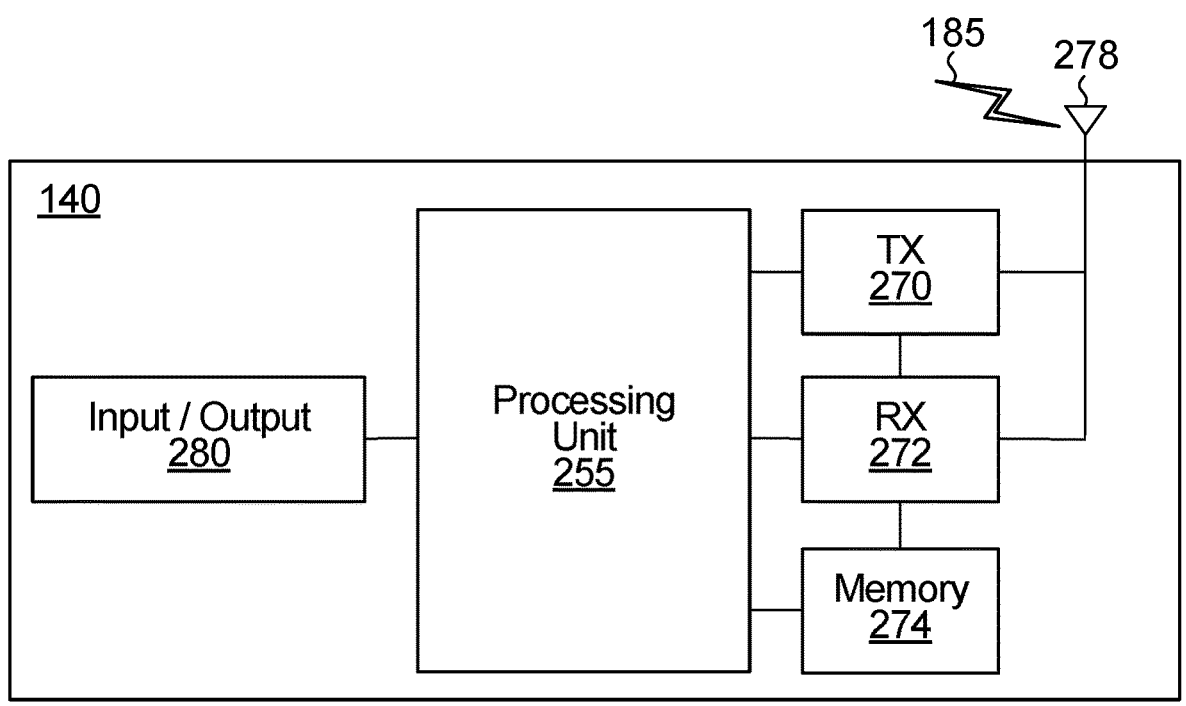
FIG. 2C is a block diagram of an example mobile switching controller in which embodiments of the disclosure may occur.

FIGS. 2A, 2B and 2C illustrate example devices that are included in system 100 of FIG. 1. FIG. 2A provides a more detailed example of components that may be included in an ED 110. FIG. 2B provides a more detailed example of components that may be included in base station 120, 130. As in FIG. 1, this base station 120 is collocated with a base station controller. Because the base station 120 is collocated with the base station controller, the base station is typically connected to the base station controller with a wired connection. However, this does not preclude the connection be made with a wireless connection. FIG. 2C provides a more detailed example of components that may be included in mobile switching controller 140. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. Signalling occurring over the communication link 180 between the ED 110 and base station 120,130 may utilize a hybrid modulation scheme as described in the present disclosure. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 120 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 120. The scheduler for instance may be in the base station controller (not shown). The processing unit 250 implements various processing operations of the base station 120, such as signal coding, data processing, power control, input/output processing, or any other functionality. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs, to other bases stations via a point-to-point link, to the mobile switching controller via a point-to-point link or to other devices. Each receiver 254 includes any suitable structure for processing signals received wirelessly or by wire from one or more EDs, from other bases stations via the point-to-point link, from the mobile switching controller via the point to point link, or from other devices. Although shown as separate components, at least one transmitter 252 and at least one receiver 254 could be combined into a transceiver. Each antenna 256 includes any suitable structure for transmitting and/or receiving wireless or wired signals to UEs on communication link 180, via a point-to-point link between base stations or via a point-to-point link between the base station and the mobile switching controller via communication link 185. Communication link 185 may be a microwave point-to-point link that utilizes embodiments of a hybrid modulation scheme as described herein. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. For example, one or more antennas could be used for communication between the base station and EDs and one or more antennas could be used for communication between base stations via the point-to-point link or via the point-to-point link between the base station and the mobile switching controller via communication link 185.

Each memory 258 includes any suitable volatile and/or non-volatile storage and retrieval device(s) such as those described above in connection to the ED 110. The memory 258 stores instructions and data used, generated, or collected by the base station 120. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

A base station 130 that is not collocated with a base station controller 135 may be similar in many ways to the base station 120 described above with regard to FIG. 2B, including many of the physical components of transmitter, receiver, processing unit, memory and input/output devices. The antenna of the base station 130 is configured to communicate with EDs 110 over wireless link 180 and communicate with the base station controller 135 over communication link 190. Communication link 190 may be a microwave point-to-point link that utilizes embodiments of a hybrid modulation scheme as described herein.

A base station controller 135 that is in communication with base station 130 may also include many of the physical components in the base station 120, such as a transmitter, a receiver, one or more processing units, memory and input/output devices. The base station controller 135 may have additional or other components as well that enable it to perform the functions necessary to perform in its roll as a base station controller The antenna of the base station controller 135 is configured to communicate with base stations 130 over wireless link 190 and communicate with the mobile switching controller 140 over communication link 185. Communication links 190 and 185 may be microwave point-to-point links that utilize embodiments of a hybrid modulation scheme as described herein.

As shown in FIG. 2C, the mobile switching controller 140 includes at least one processing unit 255, at least one transmitter 270, at least one receiver 272, one or more antennas 278, at least one memory 274, and one or more input/output devices or interfaces 280. A transceiver, not shown, may be used instead of the transmitter 270 and receiver 272. The processing unit 255 implements various processing operations of the mobile switching controller 140, such as signal coding, data processing, power control, input/output processing, or any other functionality. Each processing unit 255 includes any suitable processing or computing device configured to perform one or more operations. Each processing unit 255 could, for example, include a microprocessor, microcontroller, digital signal processor, field programmable gate array, or application specific integrated circuit.

Each transmitter 270 includes any suitable structure for generating signals for wireless or wired transmission to bases stations via the point-to-point link, to the core network, or other devices. Each receiver 272 includes any suitable structure for processing signals received wirelessly or by wire from other bases stations via the point-to-point link, or from the core network, or other devices. Each antenna 278 includes any suitable structure for transmitting and/or receiving wireless or wired signals to or from base stations via the point-to-point link, such as communication link 185, or to or from the core network. Communication link 185 may be a microwave point-to-point link that utilizes embodiments of a hybrid modulation scheme as described herein. Although a common antenna 278 is shown here as being coupled to both the transmitter 270 and the receiver 272, one or more antennas 278 could be coupled to the transmitter(s) 270, and one or more separate antennas 278 could be coupled to the receiver(s) 272. For example, one or more antennas could be used for communication between the mobile switching controller and the base station via the point-to-point link 185 and one or more antennas could be used for communication between the mobile switching controller and the core network, via a wireless or wireless connection.

Each memory 274 includes any suitable volatile and/or non-volatile storage and retrieval device(s) such as those described above in connection to the ED 110. The memory 274 stores instructions and data used, generated, or collected by the mobile switching controller 140. For example, the memory 274 could store software instructions or modules configured to implement some or all of the functionality and/or embodiments described above and that are executed by the processing unit(s) 255.

Each input/output device 280 permits interaction with a user or other devices in the network. Each input/output device 280 includes any suitable structure for providing information to or receiving/providing information from a user, including network interface communications.

Additional details regarding the UEs 110, the base stations 120, 130, the base station controllers 135, and the mobile station controllers are known to those of skill in the art. As such, these details are omitted here for clarity.

While the system described with regard to FIG. 1 includes various communication links that may be microwave point-to-point links that support signalling that could utilize a hybrid modulation scheme as described in the present disclosure, it should be understood that the hybrid modulation scheme may be used in other implementations. Some example alternatives to the microwave point-to-point links may include wired communication links that may use a high order modulation scheme, such as between the mobile switching controller and the core network or a high order communication link used for WFi communications between an access point and ED.

Quadrature amplitude modulation (QAM) modulation is a digital modulation scheme in which an $N_{QAM}=\log_2(N)$ bit length symbol is mapped onto an N point constellation, where the $N_{QAM}$ bits are binary bits.

Figure 3A:
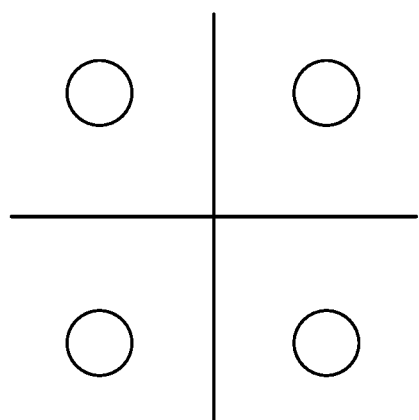
FIGS. 3A and 3B are examples of a 4 QAM constellation and 1024 QAM constellation, respectively.
Figure 3B:
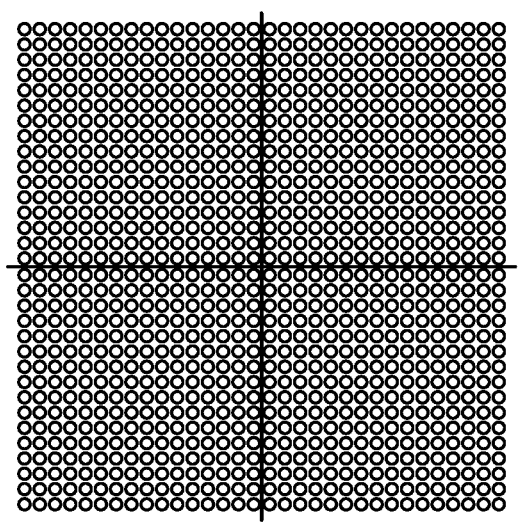

Two examples of QAM constellations are shown in FIGS. 3A and 3B. In FIG. 3A, a four-point constellation is shown where each of the four points is identified by 2 binary bits, i.e. 00, 01, 10 and 11. 4 QAM modulation is used to map a two bit symbol onto one of the four points in the constellation. FIG. 3B is a 1024-point constellation where each point is represented by a string of 10 binary bits. 1024 QAM modulation is used to map a ten bit symbol onto one of the 1024 points in the constellation. 4 QAM and 1024 QAM are merely two examples of QAM modulation schemes and it is understood that many other sizes of QAM and corresponding QAM constellations exist and may be used. The higher the order of the QAM modulation, the more bits per symbol can be transmitted. Some ultra-high capacity microwave backhaul systems use 1024 QAM, or even higher constellation. For example, by combining 1024 QAM with adaptive coding and modulation (ACM) and cross polarization interference cancellation (XPIC), it is possible to obtain gigabit capacity in a single 56 MHz channel.

QAM modulation constellations can be regular or irregular. Regular QAM constellations are formed by a factor of 2 to an even power ($2^2$, $2^4$, $2^6$ and $2^8$, as examples), such that the number of constellation points can be distributed in a square grid. For example, $2^2=4$ points, which can be represented in a 2×2 point constellation (as shown in FIG. 3A), or $2^{10}=1024$ points, which can be represented in an 32×32 point constellation (as shown in FIG. 3B). Irregular QAM constellations are formed by a factor of 2 to an odd power ($2^3$, $2^5$, $2^7$ and $2^9$, as examples), such that the number of constellation points cannot be distributed in a square. For example, $2^3=8$ does not have an integer square root, nor does $2^7=128$.

Points in the QAM modulation constellation can be derived as shown below in equation (1).

$$x=\sqrt{I_i^2+Q_i^2}\,\exp(j\theta) \qquad (1)$$

where I is the amplitude of the in-phase carrier and Q is the amplitude of the quadrature phase carrier, $i=0, 1, \ldots, N-1$, where N is the number of point in the constellation and $$\theta = \tan^{-1}\frac{Q_i}{I_i}.$$

Figure 4:
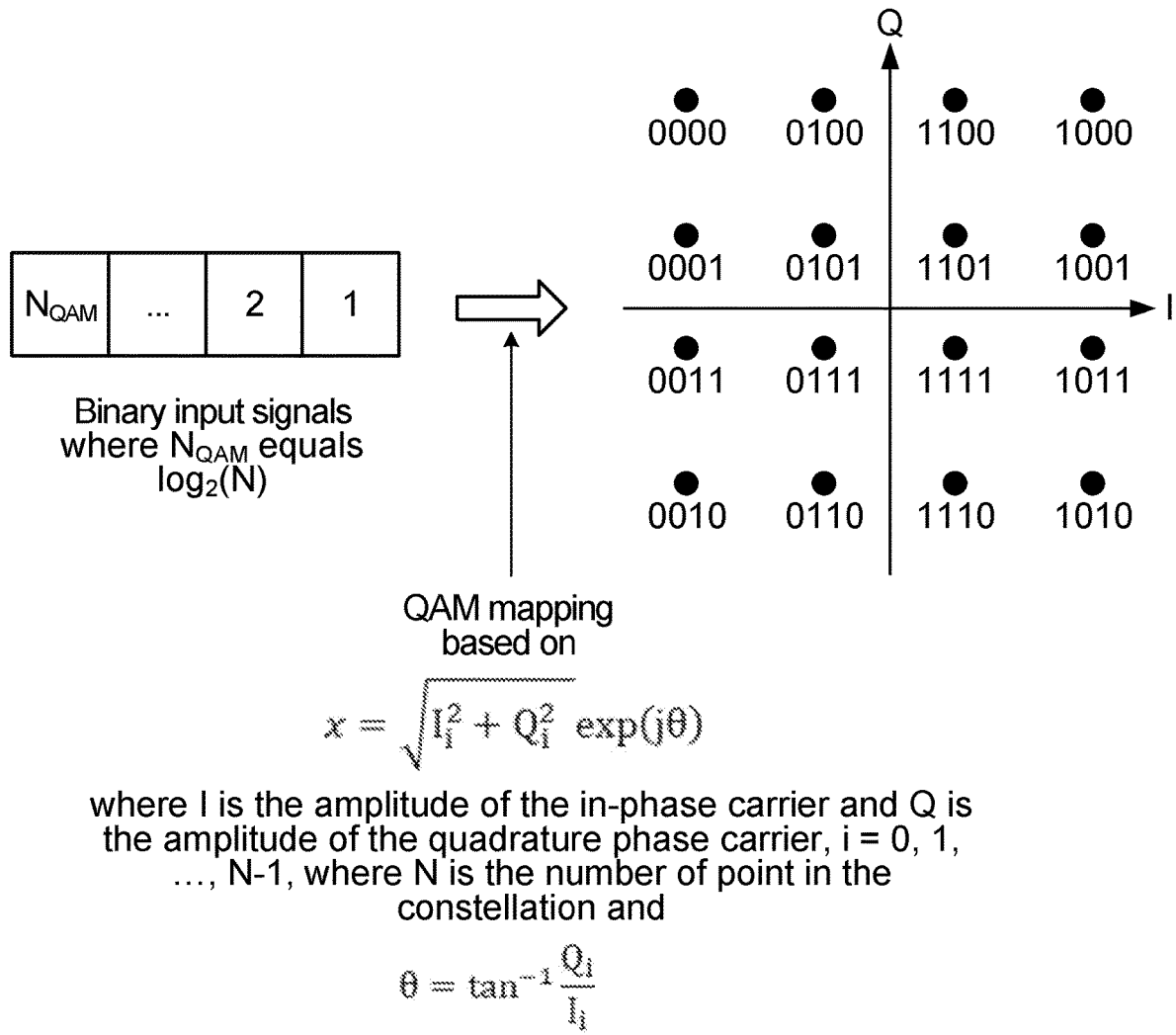
FIG. 4 is a schematic diagram of a 4 bit symbol being mapped to a 16 point QAM constellation.

FIG. 4 illustrates an example of how a $N_{QAM}=\log_2(N)$ bit symbol can be mapped to a N QAM modulation constellation using a QAM mapping based on equation (1). In the example, of FIG. 4, N=16 and $N_{QAM}=4$.

Figure 5:
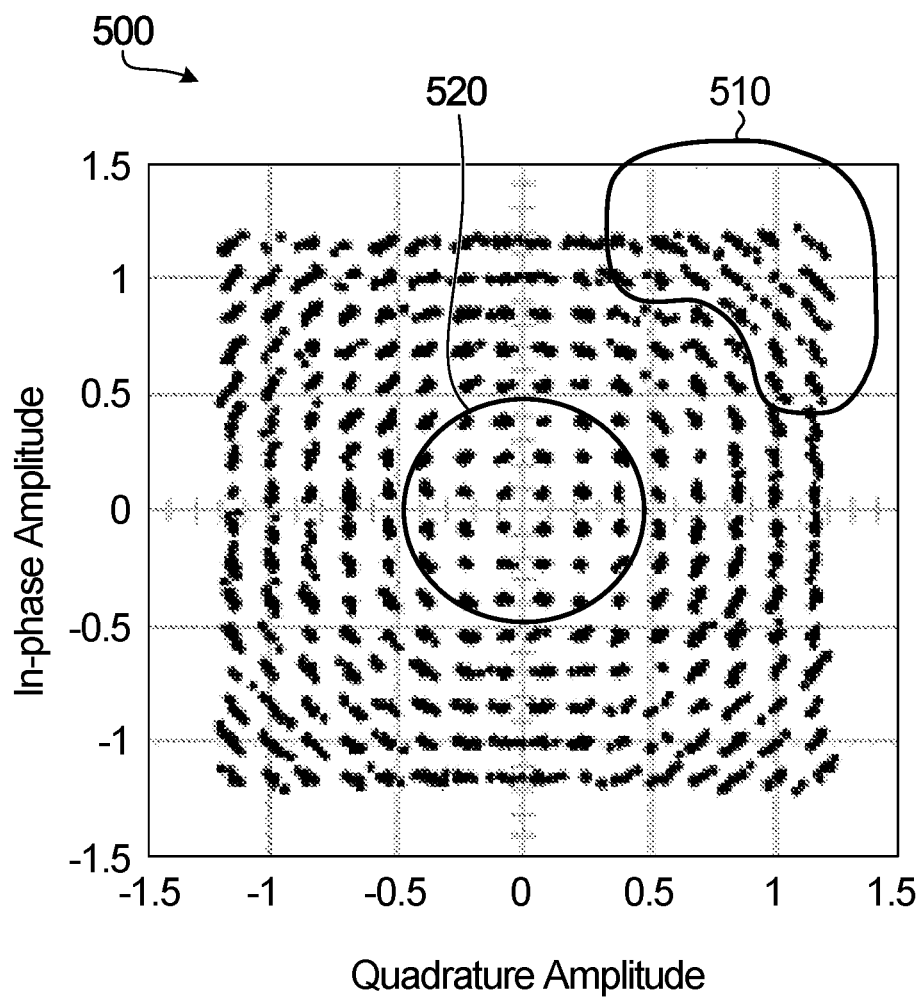
FIG. 5 is an example illustrating phase noise impact on a 1024 QAM modulation constellation.

QAM modulation is generally considered easy to implement. However, QAM modulation is considered to have high Peak-to Average Power Ratio (PAPR) and is sensitive to phase noise. FIG. 5 shows an example of the effect of AWGN and phase noise on a 1024-QAM constellation 500. The constellation points towards the outer edges of the constellation are more sensitive to phase noise than the points of the inner portion of the constellation. For example, the constellation points in the area identified by reference character 510 are shown to be somewhat dispersed as opposed to the constellation points near the middle 520 of the constellation Amplitude and phase-shift keying (APSK) modulation is another digital modulation scheme in which an $N_{APSK}=\log_2(M)$ bit length symbol is mapped onto an M point constellation, where the $N_{APSK}$ bits are binary bits. M order APSK modulation locates M constellation points on specified phase shift keying (PSK) rings that have particular radius and particular phase offset.

Constellation points in the APSK modulation constellation can be expressed as shown below in equation (2).

$$X = \begin{cases} R_1\exp\left(j\left(\frac{2\pi}{M_1}i+\theta_1\right)\right), & i=0,\ldots,M_1-1, \\ R_2\exp\left(j\left(\frac{2\pi}{M_2}i+\theta_2\right)\right), & i=0,\ldots,M_2-1, \\ \vdots & \vdots \\ R_{N_C}\exp\left(j\left(\frac{2\pi}{M_{N_C}}i+\theta_{N_C}\right)\right), & i=0,\ldots,M_{N_C}-1, \end{cases} \qquad (2)$$

where the modulation order is equal to the sum of all $M_L$ for $L=1, 2, \ldots, N_C$, where $N_C$ is the number of concentric rings, $N_C \geq 2$. $M_L$ is the number of constellation points in the Lth ring. $R_L$ is the radius of the Lth ring. $\theta_L$ is the phase offset of the Lth ring.

Figure 6:
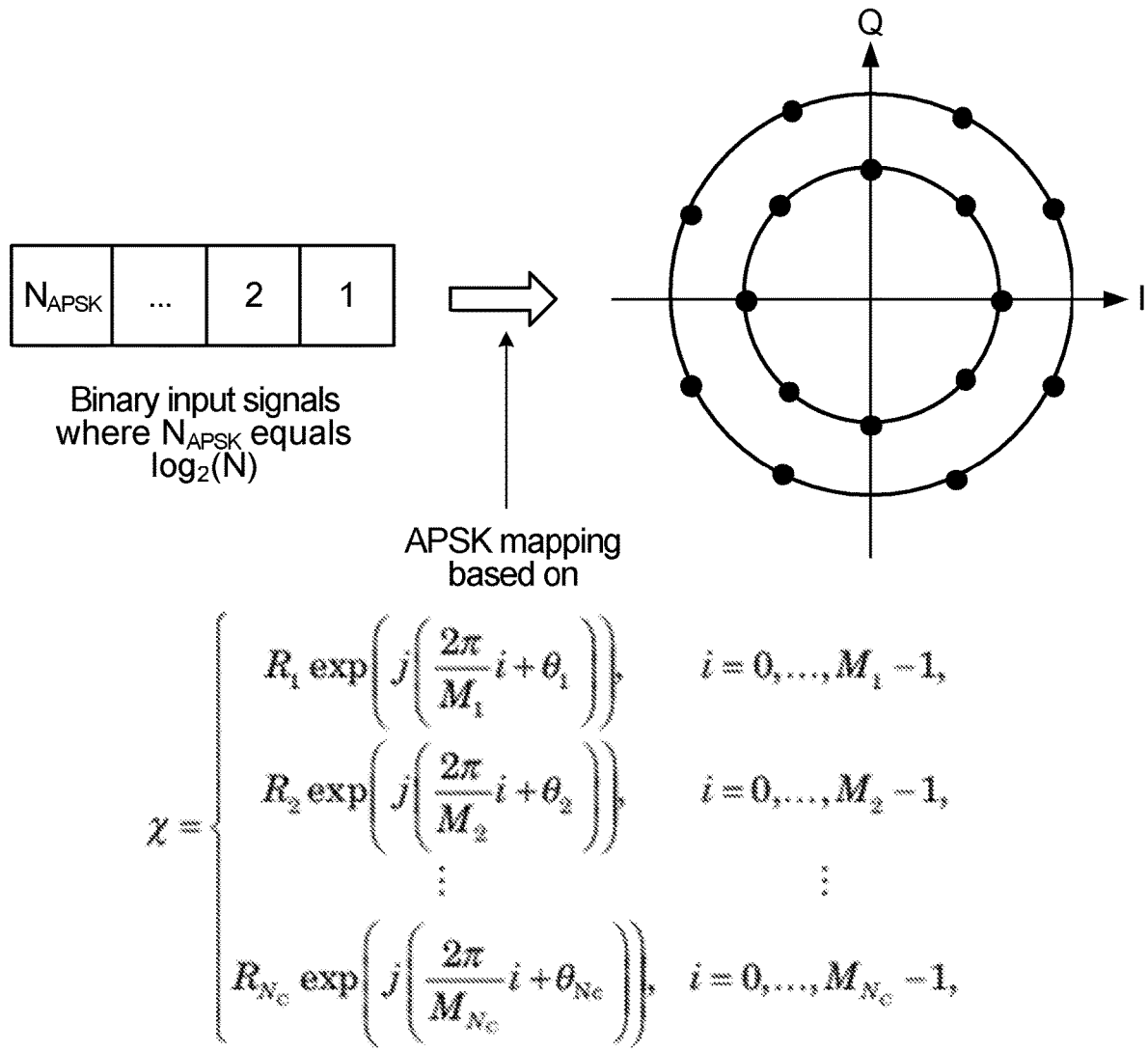
FIG. 6 is a schematic diagram of a 4 bit symbol being mapped to a 16 point APSK constellation.

FIG. 6 illustrates an example of a $N_{APSK}=\log_2(M)$ bit symbol that is mapped to an M APSK modulation constellation. In the example of FIG. 6, M=16 and $N_{APSK}=4$.

APSK modulation typically has a lower PAPR and is less sensitive to phase noise than QAM modulation, but the implementation of APSK modulation is often more complex than for QAM modulation.

Aspects of the disclosure propose combining QAM and APSK modulation schemes to benefit from the advantageous aspects of the two modulation schemes.

Figure 7A:
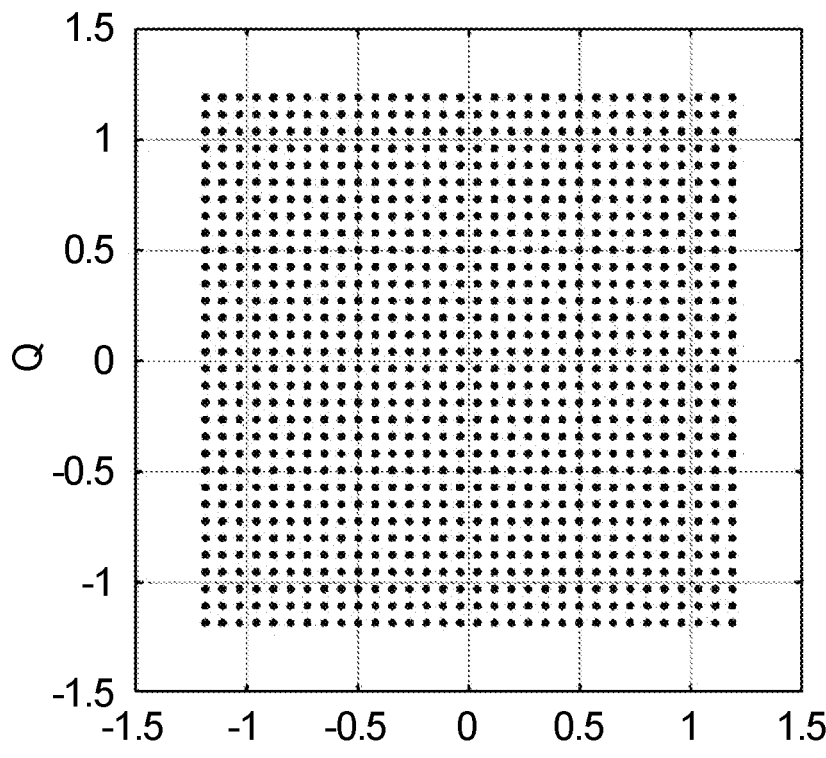
FIGS. 7A, 7B, and 7C are examples of a 1024 QAM constellation, a 1024 APSK constellation and a 1024 hybrid constellation according to an aspect of the present application.
Figure 7B:
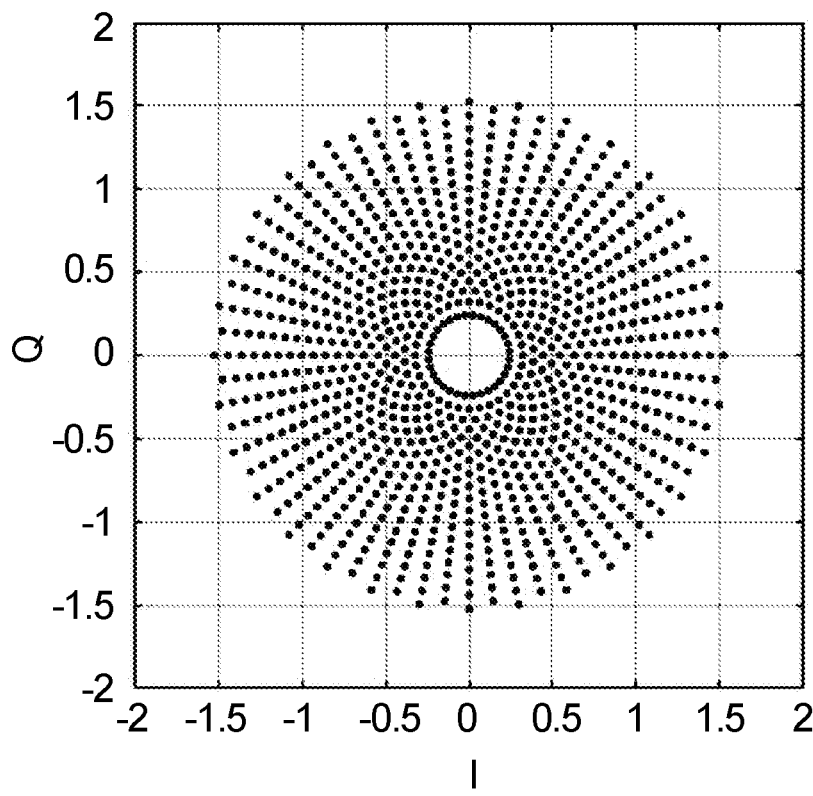
Figure 7C:
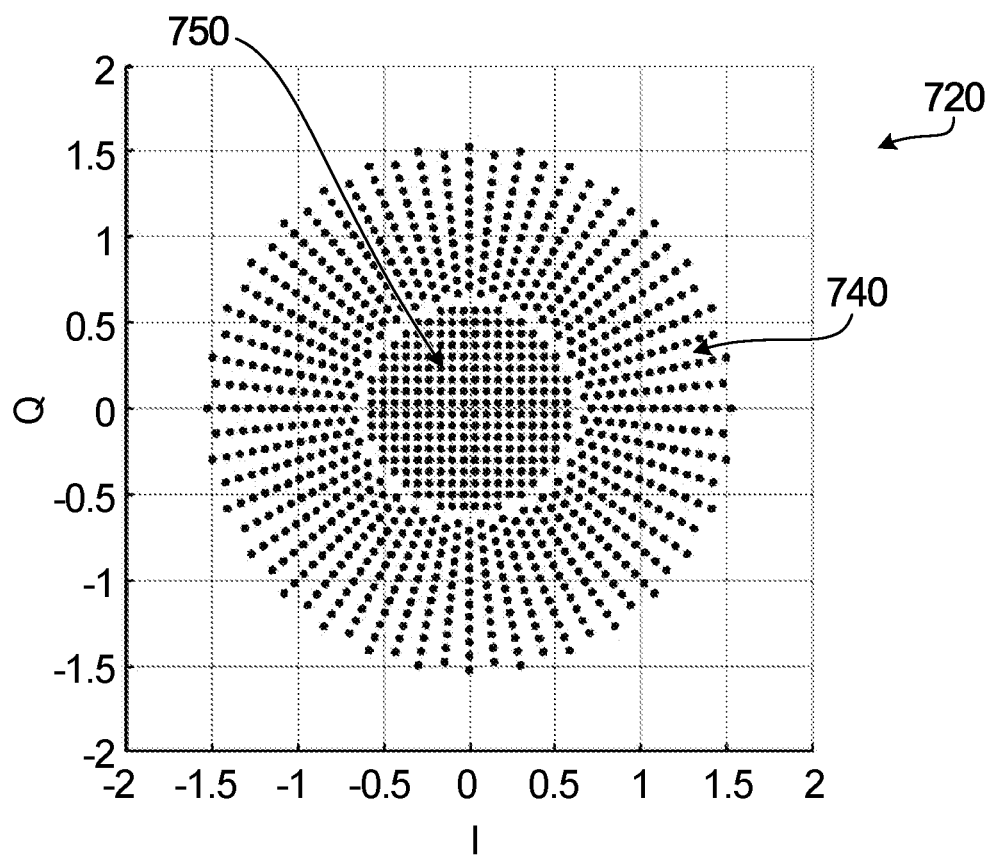

FIGS. 7A, 7B and 7C illustrate examples of a constellations based on 1024 QAM, 1024 APSK and the 1024 hybrid modulation scheme proposed herein.

In FIG. 7A, for the 1024 QAM constellation 700, the constellation points are arranged in a grid with equal spacing in the x and y directions and because the number of points is 2 to the power of an even number, the constellation points form a grid of 32×32 points.

In FIG. 7B, for the 1024 APSK constellation 710, the constellation points are arranged in a series of concentric rings.

FIG. 7C is an example of a hybrid constellation 720 resulting from the proposed hybrid modulation. K order modulation based on the hybrid modulation scheme results in K constellation points in a constellation that is a combination of a QAM grid and an APSK grid. It is easily seen in FIG. 7C that the inner portion 730 of the hybrid modulation constellation is on the QAM grid where the constellation points are spaced evenly in the x and y directions and the outer portion 740 of the hybrid modulation constellation is on the APSK grid where the constellation points are located on concentric rings. The value of K is the sum of points mapped from the portions of QAM modulation and APSK modulation. For a symbol with binary bits, a K order hybrid constellation has $N_{HYBRID}=\log_2(K)$ bits in the symbol.

In the manner that the QAM and APSK modulation schemes are combined, the inner portion of the constellation is based on QAM modulation and the outer portion of the constellation is based on APSK modulation.

In the hybrid modulation scheme, the portion of the constellation mapped based on QAM modulation uses equation (1) to map the points. The order N of the QAM portion is configurable, for example N may be 64, 128, 256, etc. The portion of the constellation mapped based on APSK modulation uses equation (2) to map the points. Variables in equation (2) are also configurable, which results in different constellations depending on the values selected for the respective variables. QAM points are mapped inside a smallest ring of the APSK constellation. The radius of the smallest ring varies in size for different hybrid constellations based on the value of $N_{QAM}$.

The inner portion of the constellation is governed by the QAM modulation scheme and therefore a set of least significant bits (LSB) in a $N_{HYBRID}$ bit symbol are used in mapping the QAM constellation points in the hybrid constellation. Bits that are not part of the set of the LSB in the symbol are equal to zero. Another representation of the QAM modulation portion is that the set of LSB bits from bit 1 to bit $N_{QAM}$ are used for QAM modulation and bit $N_{QAM+1}$ to bit $N_{HYBRID}$ are zeros, where $N_{QAM}$ is the number of bits used to map the N order QAM portion of the hybrid constellation. Therefore, $N=2^{N_{QAM}}$ values in the $2^{N_{HYBRID}}$ values of the symbol are mapped to QAM points. The remainder of the $2^{N_{HYBRID}}$ values are used for APSK modulation points.

When considering the spacing of the points in the hybrid modulation constellation, it is important to ensure that constellation points on the outer edge of the QAM portion are not too close to constellation points on the smallest ring of the APSK portion. If the points are less than a defined distance, there is potential for error when decoding the transmitted symbol mapped to that point due to shifting of the symbol that occurs due to channel conditions.

Figure 8:
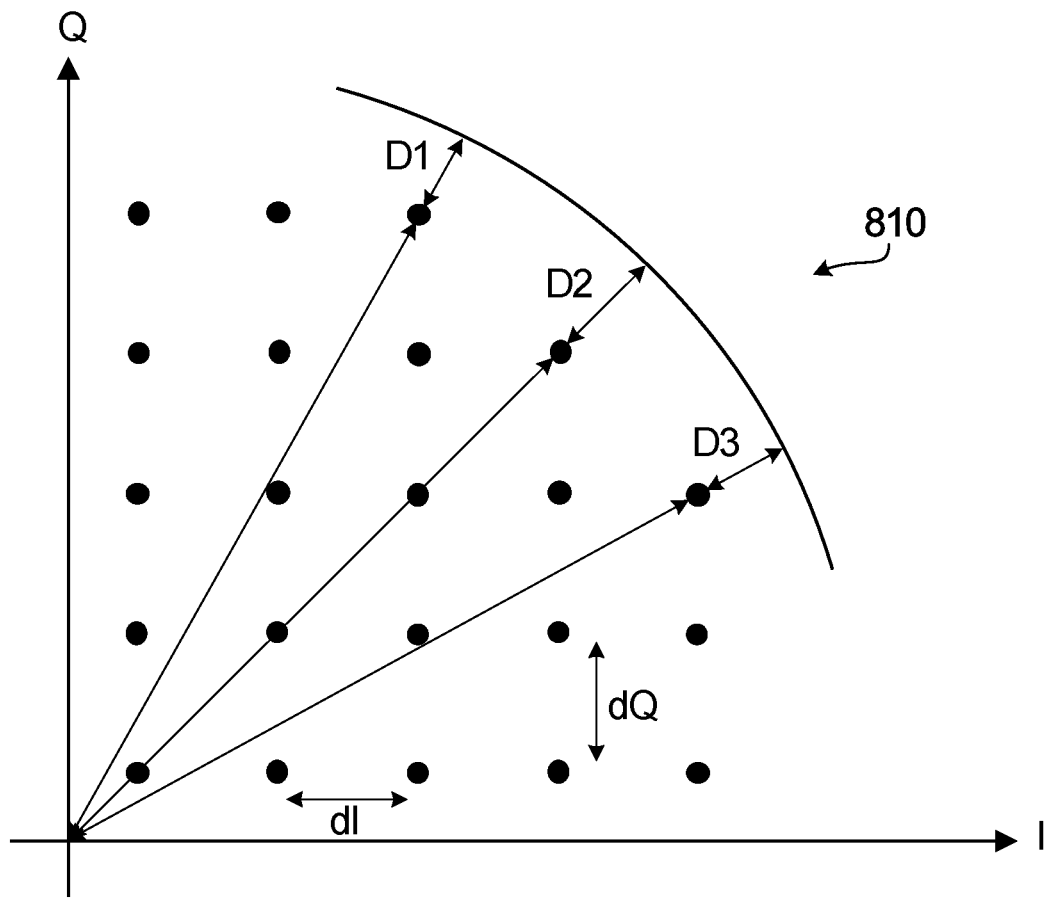
FIG. 8 illustrates a portion of a hybrid modulation constellation showing a portion of a QAM section in proximity to a smallest APSK ring of a APSK section according to an embodiment of the present disclosure.

The spacing of points in the QAM portion are defined by distance d in the I and Q directions. A distance D between any of the QAM points and the smallest ring of APSK portion should be selected such that the distance D is equal to, or larger than, the QAM grid spacing d. FIG. 8 shows a portion of a hybrid constellation having a grid of QAM constellation points that are separated from one another in a horizontal direction I by distance dI and in a vertical direction Q by distance dQ. The values of dI and dQ are both equal to the distance d. An arc 810 is representative of the smallest ring of APSK. The distance between any QAM point and a closest point on the arc 810, indicated by D1, D2 and D3, must be greater than d. One or more of the number of QAM points used in the QAM portion, the arrangement of QAM points, and the shape of the QAM points in the hybrid modulation constellation may be, in part, defined by ensuring the distance D between constellation points is in the QAM portion and the APSK portion is greater than or equal to the distance d, the closest distance between point in the QAM portion.

Figure 9:
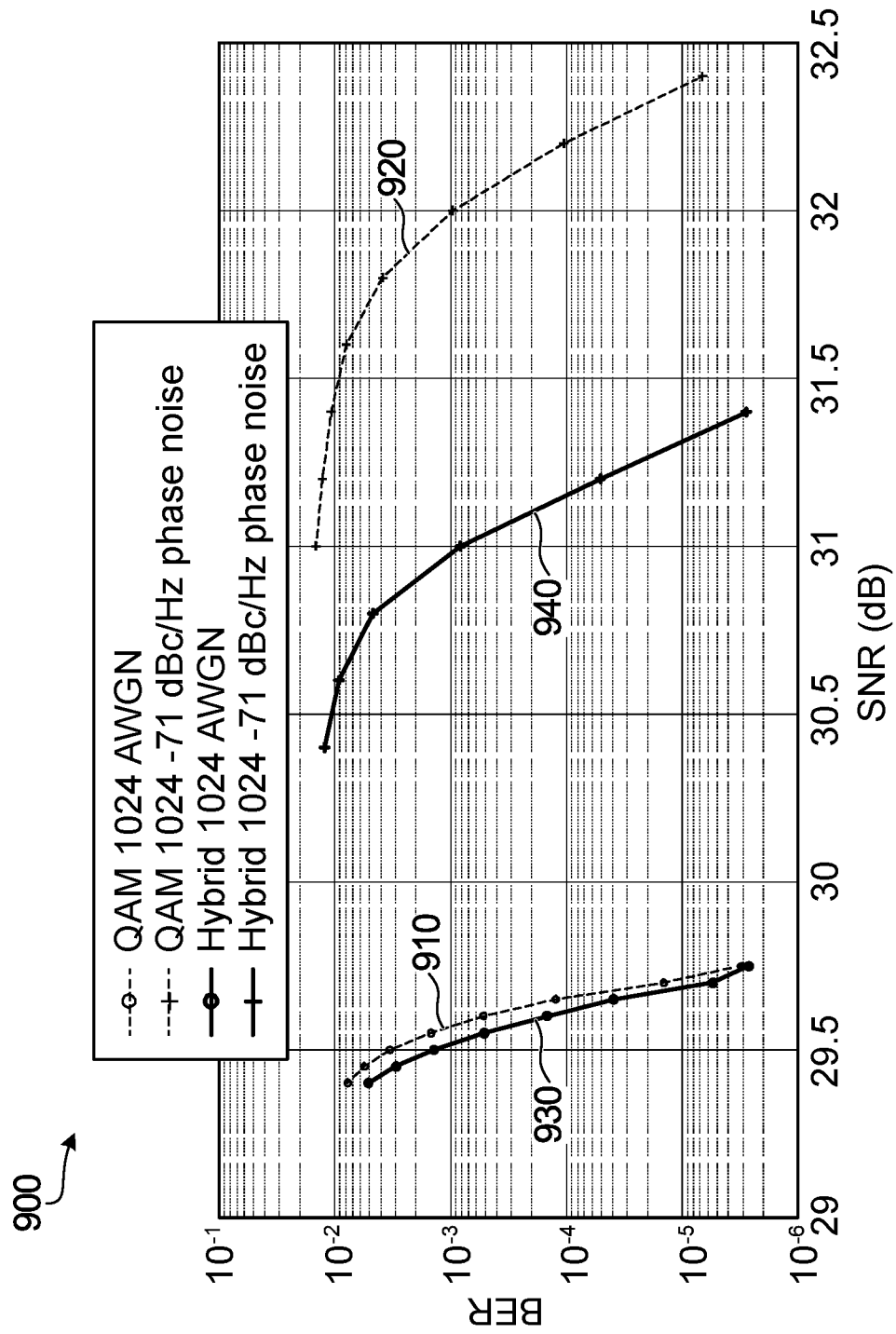
FIG. 9 is an example graphical plot comparing QAM modulation with the hybrid modulation of the present disclosure for AWGN and a specific phase noise value.

FIG. 9 is a graphical plot 900 that shows the bit error rate (BER) performance of the proposed hybrid modulation for simulated cases of AWGN and phase noise. A first curve 910 shows the BER performance for a signal with 1024 QAM modulation with AWGN. A second curve 920 shows the BER performance for a signal with 1024 QAM modulation with a phase noise level of −71 dBc/Hz at 100 kHz. A third curve 930 shows the BER performance for a signal with 1024 point hybrid modulation with AWGN. A fourth curve 940 shows the BER performance for a signal with 1024 point hybrid modulation with a phase noise level of −71 dBc/Hz at 100 kHz. When comparing the first 910 and third curves 930, it can be seen that the 1024 point hybrid modulation is approximately 0.05 dB better than 1024 QAM with regard to AWGN. When comparing the second 920 and fourth curves 940, it can be seen that in the case of the phase noise level of −71 dBc/Hz at 100 kHz, the 1024 hybrid modulation is approximately 1.1 dB better than 1024 QAM.

The hybrid modulation scheme also has lower PAPR than QAM modulation. This may be in part due to the rounded shape at the outer edge of the constellation. Table 1 below shows that the PAPR of the 1024 hybrid modulation is similar to the PAPR of 1024 APSK modulation, but the PAPR of the 1024 hybrid modulation is better than that of to the PAPR of 1024 QAM.

TABLE 1

PAPR OF 1024QAM, 1024 APSK AND 1024 HYBRID MODULATION

|  | 1024 QAM | 1024 APSK | 1024 Hybrid |
| --- | --- | --- | --- |
| PAPR (dB) | 4.50 | 3.67 | 3.72 |

As described above, the hybrid constellation can vary depending on selection of variables related to the QAM portion, the APSK portion, or both. For instance, the QAM portion can be regular QAM or irregular QAM depending on the shape of the points in the QAM portion, the overall size of the QAM portion depending on the order of the QAM portion, and the arrangement of points in the APSK portion depending on the selection of values to populate the variables in equation (2).

Figure 10A:
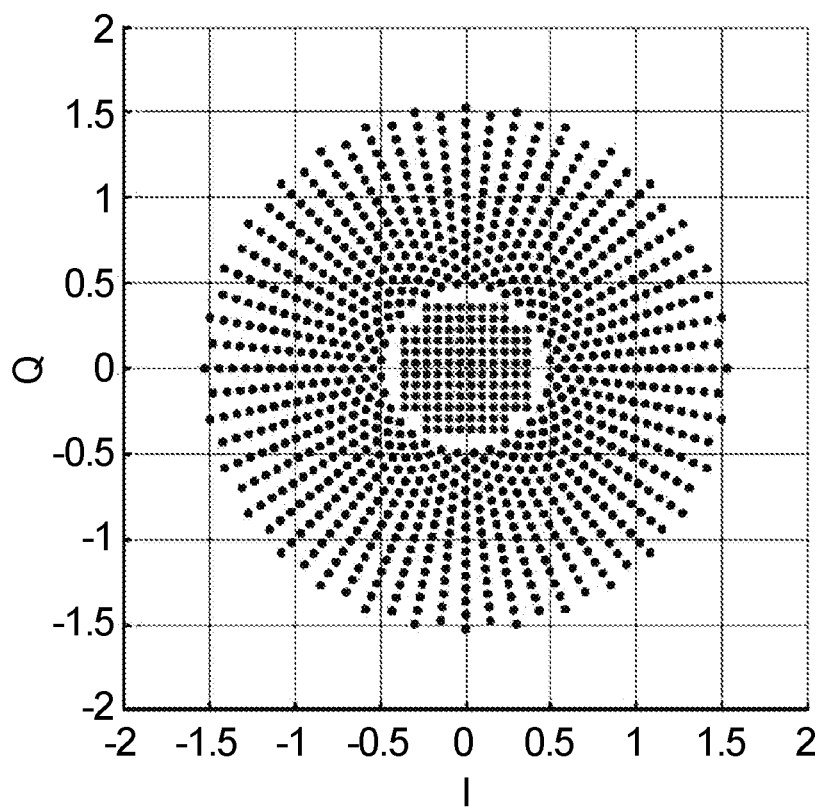
FIGS. 10A, 10B, and 10C are examples of three different 1024 hybrid modulation constellations resulting from using different values in variables that define the arrangement of points of the hybrid modulation constellation according to an aspect of the present application.
Figure 10B:
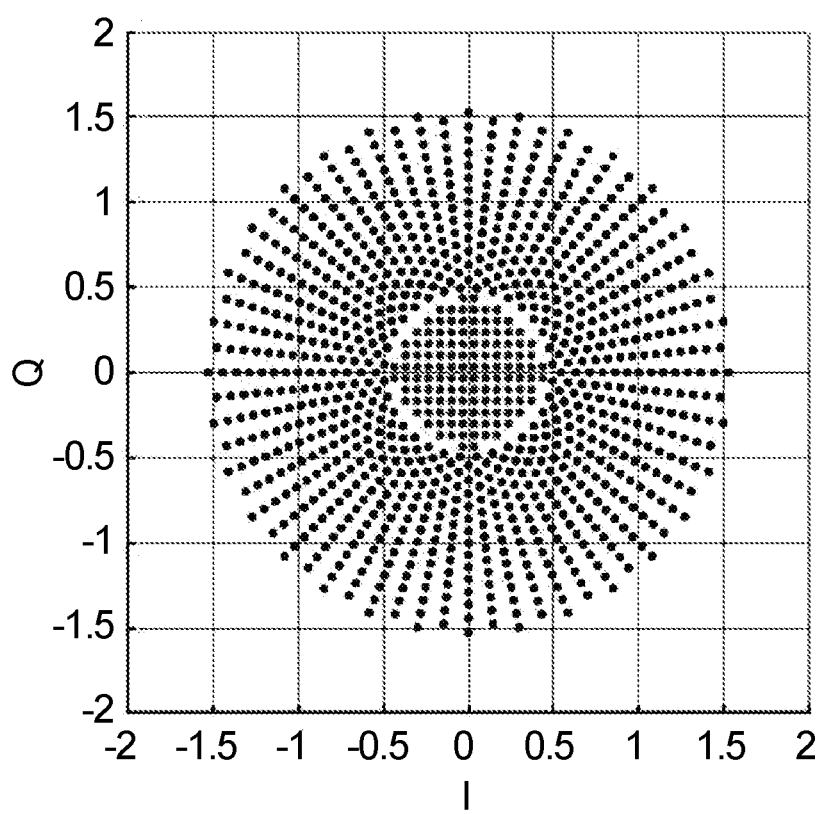
Figure 10C:
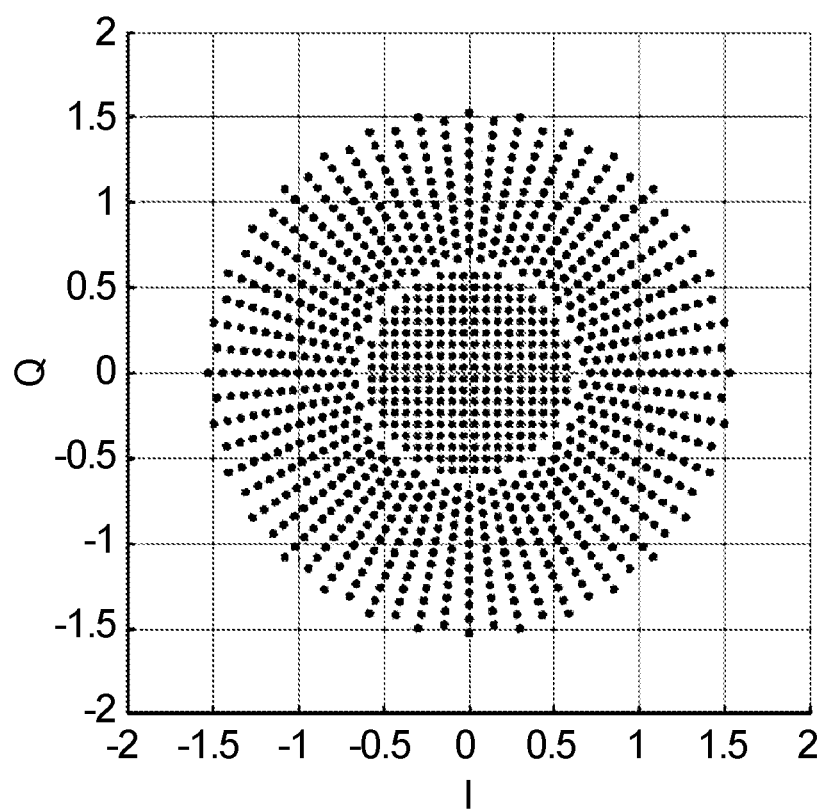

FIGS. 10A, 10B, and 10C show three different examples of hybrid constellations based on variations in the QAM portion and APSK portion. FIG. 10A illustrates an example of a 1024 hybrid modulation constellation in which the QAM portion is a regular 128 QAM in the inner portion. FIG. 10B illustrates an example of a 1024 hybrid modulation constellation in which the QAM portion is an irregular 128 QAM in the inner portion. The QAM portion is a same order QAM but a different arrangement of points. FIG. 10C illustrates an example of a 1024 hybrid modulation constellation in which the QAM portion is an irregular 256 QAM in the inner portion.

While a hybrid modulation constellation may be generated based on the above description using equation (1) to generate the QAM portion and equation (2) to generate the APSK portion, once the hybrid modulation constellation is generated with symbol values associated with particular points in the constellation, the symbol value to constellation point mapping can be stored and applied as needed. For example, the symbol value to constellation point mapping can be stored in a lookup table, so that when a particular version of the hybrid modulation is determined to be used, the constellation is not required to be generated to transmit the symbols, the symbols are mapped to the appropriate constellation point based on the lookup table. A device may have multiple such lookup tables, each for a particular hybrid modulation constellation arrangement.

Figure 11A:
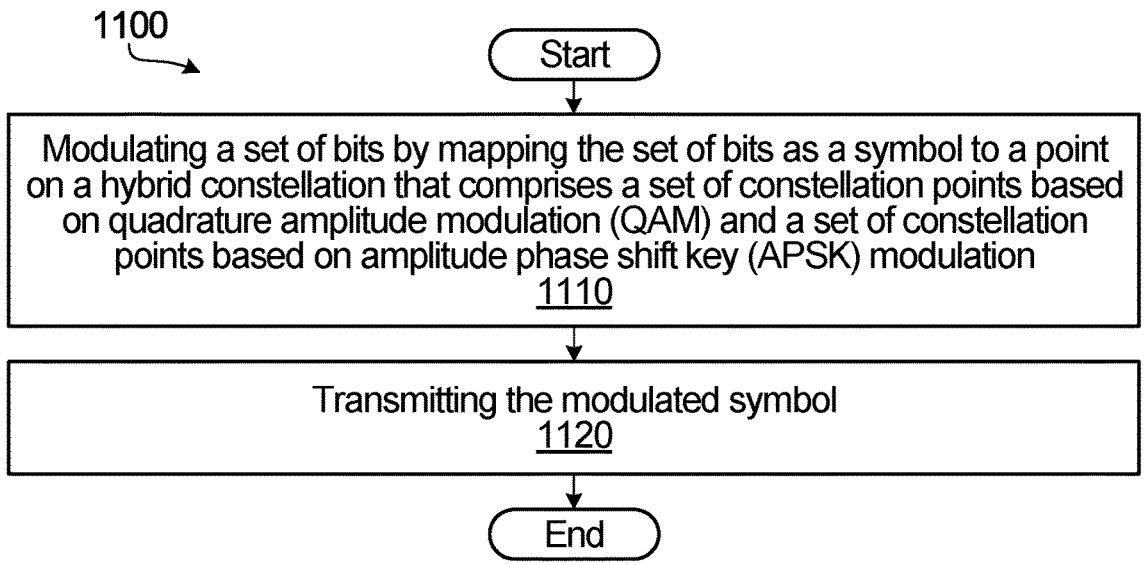
FIGS. 11A and 11B are flow charts illustrating an example method performed by a transmitter according to an embodiment of the present disclosure.

FIG. 11A is an example flow diagram 1100 that describes a method for use in a transmitter that is configured to use a hybrid QAM and APSK modulation scheme. The method involves at 1110 modulating a set of bits by mapping the set of bits as a symbol to a point on a hybrid constellation that comprises a set of constellation points based on QAM and a set of constellation points based on APSK modulation.

Figure 11B:
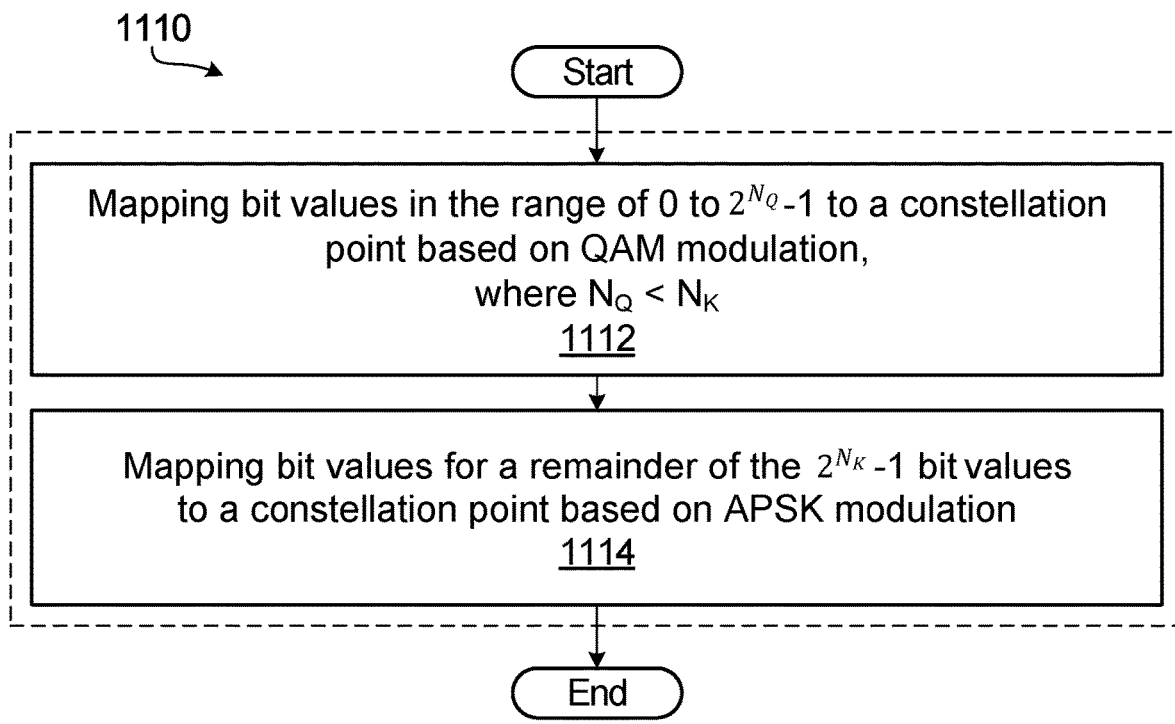

FIG. 11B is an example flow diagram that provides further detail on how the modulating 1110 of FIG. 11A takes place. Step 1112 involves mapping bit values in the range of 0 to $2^{N_Q}-1$ to a constellation point based on QAM modulation, where $N_Q < N_K$. In some embodiments, mapping bit values based on QAM modulation comprises mapping to a constellation point located in the constellation based on a function $x = \sqrt{I_i^2 + Q_i^2} \exp(j\theta)$ where I is an amplitude of an in-phase carrier and Q is an amplitude of a quadrature phase carrier, $i = 0, 1, \ldots N_K-1$ and $$\theta = \tan^{-1} \frac{Q_i}{I_i}.$$

Step 1114 involves mapping bit values for a remainder of the $2^{N_K}$ bit values to a constellation point based on APSK modulation. In some embodiments, mapping bit values based on APSK modulation comprises mapping to a constellation point located in the constellation based on a function $$x = \begin{cases} R_1 \exp\left(j\left(\frac{2\pi}{M_1}i + \theta_1\right)\right), & i = 0, \ldots, M_1 - 1, \\ R_2 \exp\left(j\left(\frac{2\pi}{M_2}i + \theta_2\right)\right), & i = 0, \ldots, M_2 - 1, \\ \vdots & \vdots \\ R_{N_C} \exp\left(j\left(\frac{2\pi}{M_{N_C}}i + \theta_{N_C}\right)\right), & i = 0, \ldots, M_{N_C} - 1, \end{cases}$$

where a modulation order of the APSK portion of the hybrid constellation is equal to the sum of all $M_L$ for $L=1, 2, \ldots, N_C$, wherein $N_C$ is a number of concentric rings, $N_C \geq 2$, $M_L$ is the number of constellation points in the Lth ring, $R_L$ is the radius of the Lth ring, $\theta_L$ is the phase offset of the Lth ring.

The size of the QAM portion of the hybrid modulation constellation, i.e. the number of points in the QAM portion, is variable depending on the desired size of the QAM portion.

The location of the points in the APSK portion of the hybrid modulation constellation is also variable based on selection of values in equation (2).

At 1120, the method involves transmitting the modulated symbol.

Figure 12:
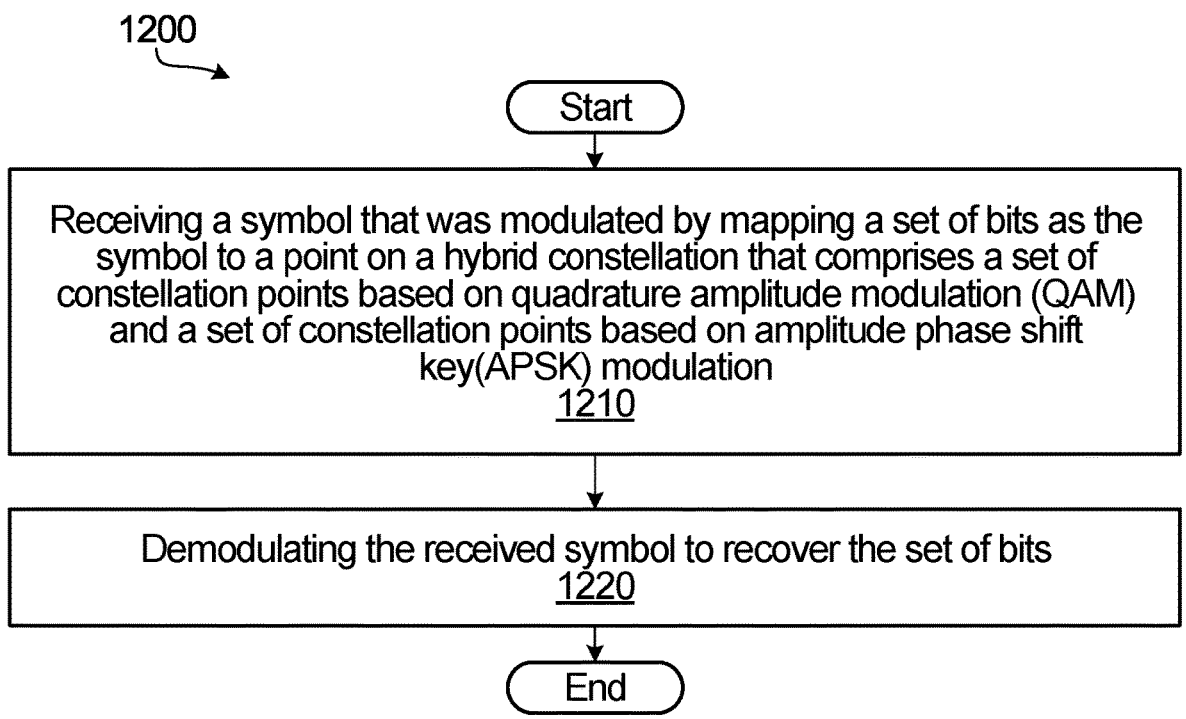
FIG. 12 is a flow chart illustrating an example method performed by a receiver according to an embodiment of the present disclosure.

FIG. 12 is an example flow diagram 1200 that describes a method for use in a receiver that is configured to receive a signal that has been modulated using a hybrid QAM and APSK modulation scheme. The method involves at 1210 receiving a symbol that was modulated by mapping a set of bits as the symbol to a point on a hybrid constellation that comprises a set of constellation points based on quadrature amplitude modulation (QAM) and a set of constellation points based on amplitude phase shift key (APSK) modulation. Step 1220 involves demodulating the received symbol to recover the set of bits.

In some embodiments, the set of bits that is received is $N_K$ bits, $N_K$ being an integer value, which results in a symbol having one of $2^{N_K}$ possible values. For the symbol that is comprised of the $N_K$ bits, bit values in the range of 0 to $2^{N_Q}-1$, are mapped to a constellation point based on QAM modulation, where $N_Q < N_K$ and bit values for a remainder of the $2^{N_K}$ bit values are mapped based on APSK modulation.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   modulating a set of bits by mapping the set of bits as a symbol to a constellation point on a hybrid constellation, the hybrid constellation comprising a plurality of constellation points that comprise both a set of constellation points based on quadrature amplitude modulation (QAM) and a set of constellation points based on amplitude phase shift key (APSK) modulation, wherein the symbol mapped to the constellation point is a single constellation point in the hybrid constellation based on either QAM or APSK modulation depending on a value of the set of bits; and
   transmitting the modulated symbol.

2. The method of claim 1, wherein when the set of bits is $N_K$ bits, resulting in a symbol having one of $2^{N_K}$ possible values;

mapping bit values in the range of 0 to $2^{N_Q}-1$ to a constellation point on the hybrid constellation based on QAM modulation, where $N_Q<N_K$; and mapping bit values for a remainder of the $2^{N_K}$ bit values to a constellation point on the hybrid constellation based on APSK modulation.

3. The method of claim 2, wherein mapping bit values based on QAM modulation comprises mapping to a constellation point located in the constellation based on a function $x=\sqrt{I_i^2+Q_i^2}\exp(j\theta)$ where I is an amplitude of an in-phase carrier and Q is an amplitude of a quadrature phase carrier, i=0, 1, ... $N_K-1$ and $$\theta = \tan^{-1}\frac{Q_i}{I_i}.$$

4. The method of claim 2, wherein mapping bit values based on APSK modulation comprises mapping to a constellation point located in the constellation based on a function $$X = \begin{cases} R_1\exp\left(j\left(\frac{2\pi}{M_1}i+\theta_1\right)\right), & i=0,\ldots,M_1-1, \\ R_2\exp\left(j\left(\frac{2\pi}{M_2}i+\theta_2\right)\right), & i=0,\ldots,M_2-1, \\ \vdots & \vdots \\ R_{N_C}\exp\left(j\left(\frac{2\pi}{M_{N_C}}i+\theta_{Nc}\right)\right), & i=0,\ldots,M_{N_C}-1, \end{cases}$$

where a modulation order of the APSK portion of the hybrid constellation is equal to the sum of all $M_L$ for L=1, 2, ..., $N_C$, wherein $N_C$ is a number of concentric rings, $N_C \geq 2$, $M_L$, is the number of constellation points in the Lth ring, $R_L$ is the radius of the Lth ring, $\theta_L$ is the phase offset of the Lth ring.

5. The method of claim 2, wherein changing the value $N_Q$ changes the number of constellation points that are mapped in the hybrid constellation based on QAM modulation.

6. The method of claim 2, wherein a distance D between a constellation point mapped based on QAM modulation and a closest constellation point mapped based on APSK modulation is equal to or greater than a distance d, which is a closest distance between adjacent constellation points mapped based on QAM modulation.

7. The method of claim 1, wherein the set of constellation points based on QAM in the hybrid constellation are arranged in a set of regular QAM constellation points or a set of irregular QAM constellation points.

8. A method comprising:

receiving a symbol that was modulated by mapping a set of bits as the symbol to a constellation point on a hybrid constellation, the hybrid constellation comprising a plurality of constellation points that comprise both a set of constellation points based on quadrature amplitude modulation (QAM) and a set of constellation points based on amplitude phase shift key (APSK) modulation, wherein the symbol mapped to the constellation point is a single constellation point in the hybrid constellation based on either QAM or APSK modulation depending on a value of the set of bits; and demodulating the received symbol to recover the set of bits.

9. The method of claim 8, wherein when the set of bits is $N_K$ bits, resulting in a symbol having one of $2^{N_K}$ possible values;

bit values in the range of 0 to $2^{N_Q}-1$, are mapped to a constellation point based on QAM modulation, where $N_Q<N_K$; and bit values for a remainder of the $2^{N_K}$ bit values are mapped based on APSK modulation.

10. A device comprising:

a processor; and a computer-readable medium having stored thereon computer executable instructions that when executed by the processor cause the device to:

modulate a set of bits by mapping the set of bits as a symbol to a constellation point on a hybrid constellation, the hybrid constellation comprising a plurality of constellation points that comprise both a set of constellation points based on quadrature amplitude modulation (QAM) and a set of constellation points based on amplitude phase shift key (APSK) modulation, wherein the symbol mapped to the constellation point is a single constellation point in the hybrid constellation based on either QAM or APSK modulation depending on a value of the set of bits; and transmit the modulated symbol.

11. The device of claim 10, wherein when the set of bits is $N_K$ bits, resulting in a symbol having one of $2^{N_K}$ possible values;

map bit values in the range of 0 to $2^{N_Q}-1$, to a constellation point based on QAM modulation, where $N_Q<N_K$; and map bit values for a remainder of the $2^{N_K}$ bit values to a constellation point based on APSK modulation.

12. The device of claim 11, wherein bit values mapped based on QAM modulation to a constellation point located in the constellation based on a function $x=\sqrt{I_i^2+Q_i^2}\exp(j\theta)$ where I is an amplitude of an in-phase carrier and Q is an amplitude of a quadrature phase carrier, i=0, 1, ... $N_K-1$ and $$\theta = \tan^{-1}\frac{Q_i}{I_i}.$$

13. The device of claim 11, wherein bit values mapped based on APSK modulation to a constellation point located in the constellation based on use a function $$X = \begin{cases} R_1\exp\left(j\left(\frac{2\pi}{M_1}i+\theta_1\right)\right), & i=0,\ldots,M_1-1, \\ R_2\exp\left(j\left(\frac{2\pi}{M_2}i+\theta_2\right)\right), & i=0,\ldots,M_2-1, \\ \vdots & \vdots \\ R_{N_C}\exp\left(j\left(\frac{2\pi}{M_{N_C}}i+\theta_{Nc}\right)\right), & i=0,\ldots,M_{N_C}-1, \end{cases}$$

where a modulation order of the APSK portion of the hybrid constellation is equal to the sum of all $M_L$ for L=1, 2, ..., $N_C$, wherein $N_C$ is a number of concentric rings, $N_C \geq 2$, $M_L$, is the number of constellation points in the Lth ring, $R_L$ is the radius of the Lth ring, $\theta_L$ is the phase offset of the Lth ring.

14. The device of claim 11, wherein changing the value $N_Q$ changes the number of constellation points that are mapped to the hybrid constellation based on QAM modulation.

15. The device of claim 11, wherein a distance D between a constellation point mapped based on QAM modulation and a closest constellation point mapped based on APSK modulation is equal to or greater than a distance d, which is a closest distance between adjacent constellation points mapped based on QAM modulation.

16. The device of claim 10, wherein the set of constellation points based on QAM in the hybrid constellation are arranged in a set of regular QAM constellation points or a set of irregular QAM constellation points.

17. The device of claim 10, wherein the device is:
a network side device; or
a user equipment (UE).

18. A device comprising:
a processor; and
a computer-readable medium having stored thereon computer executable instructions that when executed by the processor cause the device to:
receive a symbol that was modulated by mapping a set of bits as the symbol to a constellation point on a hybrid constellation, the hybrid constellation comprising a plurality of constellation points that comprise both a set of constellation points based on quadrature amplitude modulation (QAM) and a set of constellation points based on amplitude phase shift key (APSK) modulation, wherein the symbol mapped to the constellation point is a single constellation point in the hybrid constellation based on either QAM or APSK modulation depending on a value of the set of bits; and
demodulate the received symbol to recover the set of bits.

19. The device of claim 18, wherein when the set of bits is $N_K$ bits, resulting in a symbol having one of $2^{N_K}$ possible values;
bit values in the range of 0 to $2^{N_Q}-1$, are mapped to a constellation point based on QAM modulation, where $N_Q < N_K$; and
bit values for a remainder of the $2^{N_K}$ bit values are mapped based on APSK modulation.

20. The device of claim 18, wherein the device is:
a network side device; or
a user equipment (UE).

* * * * *